United States Patent
Light et al.

(10) Patent No.: US 7,483,952 B2
(45) Date of Patent: Jan. 27, 2009

(54) SYSTEM TRANSMITTING UNSOLICITED AND UNCONFIRMED COMPUTING PLATFORM SERVICE INFORMATION TO WIRELESS DEVICES

(75) Inventors: John J. Light, Beaverton, OR (US); Muralidharan Sundararajan, Portland, OR (US); Trevor A. Pering, Mountain View, OR (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1019 days.

(21) Appl. No.: 10/659,632

(22) Filed: Sep. 10, 2003

(65) Prior Publication Data
US 2005/0055421 A1 Mar. 10, 2005

(51) Int. Cl.
*G06F 15/16* (2006.01)
(52) U.S. Cl. .................... 709/207; 709/218; 709/219
(58) Field of Classification Search ............... 709/217, 709/218, 223, 250, 207, 219; 455/414.1; 717/140; 706/47; 340/573.1
See application file for complete search history.

(56) References Cited

U.S. PATENT DOCUMENTS

| | | | | |
|---|---|---|---|---|
| 6,782,253 | B1 * | 8/2004 | Shteyn et al. | 455/414.1 |
| 6,895,444 | B1 * | 5/2005 | Weisshaar et al. | 709/250 |
| 2004/0036611 | A1 * | 2/2004 | Kidney et al. | 340/573.1 |
| 2004/0043758 | A1 * | 3/2004 | Sorvari et al. | 455/414.1 |
| 2004/0083195 | A1 * | 4/2004 | McCord et al. | 706/47 |
| 2004/0158823 | A1 * | 8/2004 | Saint-Hilaire et al. | 717/140 |
| 2004/0221007 | A1 * | 11/2004 | Roe et al. | 709/203 |

OTHER PUBLICATIONS

Want, Roy, et al., "The Personal Server: Changing the Way We Think about Ubiquitous Computing", G. Boriello and L.E. Holmquist (Eds.): *UbiComp 2002, LNCS 2498*, Springer-Verlag Berlin Heidelberg, (Sep. 29, 2002), 194-209.

* cited by examiner

*Primary Examiner*—Le Luu
(74) *Attorney, Agent, or Firm*—Schwegman, Lundberg & Woessner, P.A.

(57) ABSTRACT

An apparatus and a system, as well as a method and article, may operate to receive solicited or unsolicited computing platform service information associated with services offered by a plurality of service points in a range area, store some portion of the received information, and periodically transmit, with or without confirmation, some portion of the stored information to one or more potential subscribers.

42 Claims, 3 Drawing Sheets

SYSTEM TRANSMITTING UNSOLICITED AND UNCONFIRMED COMPUTING PLATFORM SERVICE INFORMATION TO WIRELESS DEVICES

TECHNICAL FIELD

Various embodiments described herein relate to data processing generally, including apparatus, systems, and methods used to discover and/or broadcast services used by computing platforms.

BACKGROUND INFORMATION

In a number of geographic locations, one or more services may be made available to wireless computing platform users. For example, wireless personal digital assistant (PDA) users passing a bookstore entrance may be offered access to an internet connection providing an on-sale list, as well as to an in-store printer that can be used to print coupons, search results, and inventory listings. As the quantity and variety of such service offerings increase, greater effort and resources may be required to determine precisely which services are available for use at any single location.

One solution is to create a central facility to manage access to available services. Routing all service communication traffic through such a facility, while possible, can quickly become logistically difficult. In addition, facility failures may result in the loss of service availability. On the other hand, taking the time to make inquiries into the availability of each service offered at a particular location may result in missing available services. Such an inquiry process may also operate more slowly than most consumers are willing to tolerate.

DETAILED DESCRIPTION

Figure 1:
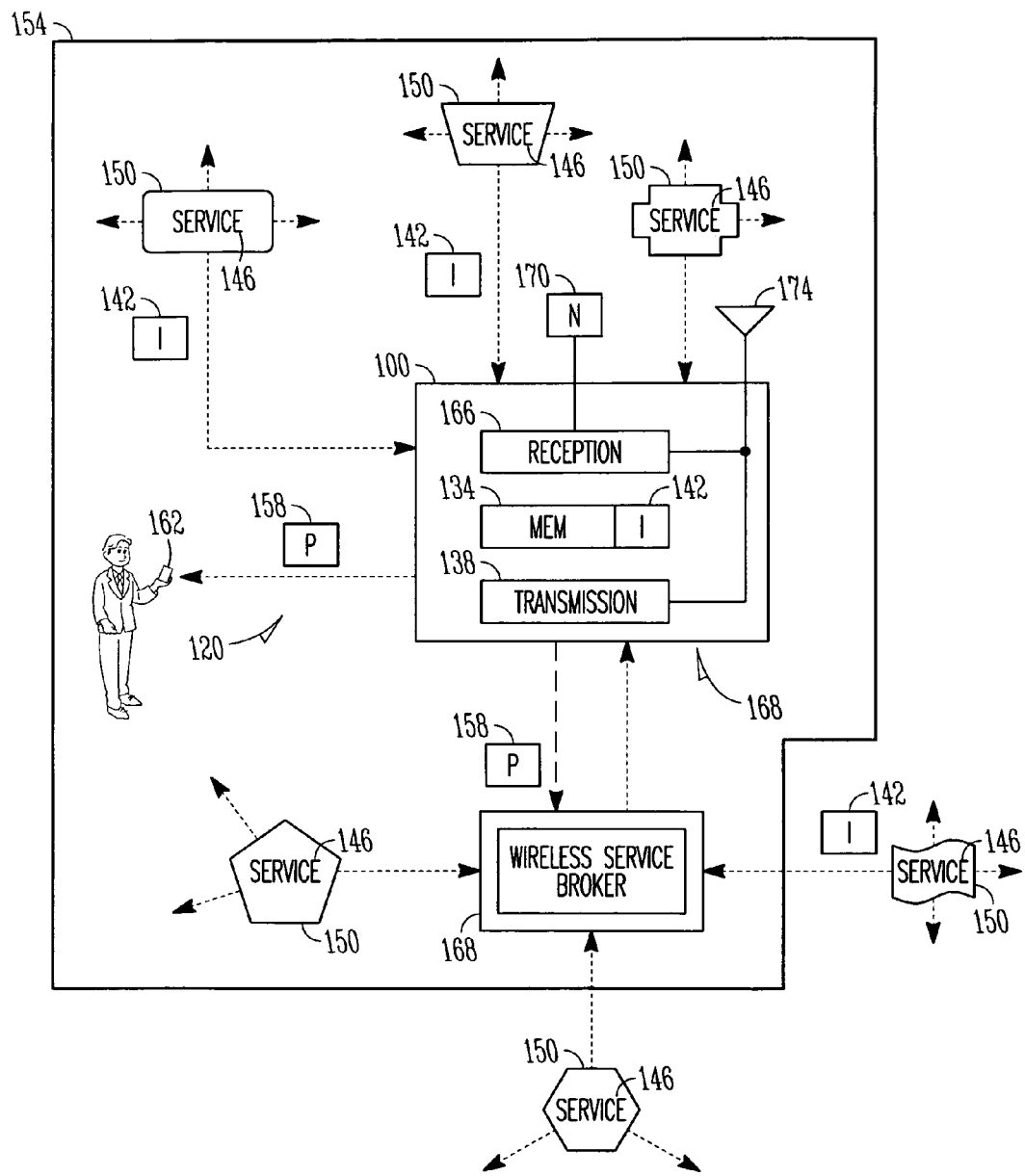
FIG. 1 is a block diagram of an apparatus and a system according to various embodiments.

In the following detailed description of various embodiments, reference is made to the accompanying drawings that form a part hereof, and in which are shown by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Services, for the purposes of this document, may include any service that can be delivered over a network, including wired networks and wireless networks, such as network connection services, printer services, display services, storage services, inventory services, game services, interactive customer services, query services (e.g., questions and answers, listings of frequently asked questions, and/or search engine services), communication services (e.g., long distance radio transmission and reception services), and/or advertising services, among many others. For example, a grocery store environment may have several wireless service points, each advertising its own service, such as inventory access, printing services, and a display of daily specials. Therefore, some embodiments may be compatible with a decentralized wireless environment, including those having low bandwidth, such as an environment including Bluetooth devices (i.e., see the Bluetooth System Specification, Bluetooth Special Interest Group, Ver. 1.1 and later versions, March 2001), and each service in such an environment may advertise its existence and/or availability.

To determine the existence and availability of the services in an environment, some embodiments may comprise a wireless service broker (WSB), which receives information about one, some, or all of the services offered within a given area. A formatted list of the available services may be created, and the list may be periodically broadcast throughout a selected range area for the benefit of various potential subscribers. The WSB may also gather information from other WSBs, for rebroadcast to potential subscribers, if desired.

Any potential subscriber, perhaps upon entry into the range area (e.g., a person carrying a PDA into a particular store), might then obtain a summary of services offered within the selected range area without having to discover (or make connection with) every service provider in the vicinity. In this example, the PDA may choose to listen for all services available in the store, using the WSB broadcast information to fill in gaps in service offerings, or the PDA may choose to listen only to brokers broadcasting in the store. As new services become available, or as old services terminate, the WSBs in the affected area may update the list of offered services, eliminating the need for explicit service administration.

In the wired networking world, a directory service called a Name Server may be provided to match a textual name against a machine address, and used for finding both machines and services in a wired network through a single well known address. Because the number of entries in a Name Server can be very large, some systems add attributes to each entry so that classes of machines or services can be found by making a single query. This mechanism is sometimes called "attribute based naming." When new services appear on a wired network, they may be permitted to register their name and address in the Name Server, along with an attribute, or set of attributes, describing properties of that service. Services may be near a potential subscriber, or miles away, linked by various types of networks.

When wireless services are provided, it is often the case that services to be accessed by potential subscribers are in substantially the same physical locality. Due to variations in signal strength, etc., which affect the useful range of wireless devices, information regarding the availability of services to wireless devices may not be accurate, in the sense that a WSB may be able to communicate with a specific service, but a potential subscriber may not. In such cases, a potential subscriber may need guidance with respect to selecting available services.

Effective wireless communication may also be enhanced by using an attribute mechanism, similar to or identical to that described in the wired environment. At the time of registration, a wireless service might include a number of attributes to guide the choice of a potential subscriber including, for example, the location of the wireless service (e.g., latitude, longitude, or some other coordinate system) and the signal strength or range of the service broker determined during the registration process. A potential subscriber given the choice of a number of wireless services could choose one that is in the same general area as the subscriber, improving the chance of successful communication.

If a number of accessible WSBs are aware of their own location and can share information about signal strength or distance with a selected wireless service, the position of the service may be estimated. A service query to a WSB may return the results of this calculation, or even the raw signal strength or distance data, leaving it up to the potential subscriber to make the final calculation. For example, a signal based time-of-flight measuring mechanism may allow distance to be estimated between two devices.

Additional services coupled to a wired network might be useful to a wireless client or other potential subscriber. However, such services might only be useful if they are in the same general location. For example, a wired network printer may be useful to a wireless device if it is in the same room or at least an adjoining room, but maybe not if it is half a mile away. On the other hand, if a wireless network connection is available to a wired (or wireless) service, and the wireless network connection is within the useful range of a potential subscriber, such services may also be selected by the subscriber. In either case, wired services (or wireless devices coupled to wired services) may also register their location (e.g., perhaps programmed at the time they are installed) if their location meets some type of "nearness" criteria. The decision to actually register a wireless service in a selected WSB can also be made by the WSB itself based on location attributes. In this case the WSB may take into account the location of various wireless access points through which the potential subscriber can access the wired service.

In some embodiments, service type information attributes can be included when a wireless service registers with a WSB, along with other attributes, such as signal strength, range, location, etc. Thus, when a string matching query is made by a subscriber for a particular type of service (or set of types of service, such as a print service, or a display service), the WSB receiving the query may respond with a list of services matching the query, including attributes for each service. The attributes, such as signal strength, range location, etc. can be used to choose an optimal service for connection and use. If connection attempts fail for some reason, then the next optimal service may be selected, and so on.

FIG. 1 is a block diagram of an apparatus 100 and a system according to various embodiments, each of which may operate in the manner described above. For example, an apparatus 100 may comprise a memory module 134 and a transmission module 138. The memory module 134 may be used to store computing platform service information 142 associated with one or more services 146 offered by at least a subset of a plurality of service points 150 within some designated range area 154. Such information 142 may be solicited (e.g., received in response to a specific query or request by the apparatus 100, perhaps as the result of a polling process). The information 142 may also be unsolicited, meaning that the information 142 is received by the apparatus 100 after being transmitted by service points 150 without any associated query being made by the apparatus 100. The area 154 may be limited using fixed geographic waypoints, fixed or mobile physical devices, network timing parameters, and/or radio signal strength, among other mechanisms. The computing platform service information 142 may comprise one or more attributes (such as service type attributes and other attributes, described previously) associated with one or more services 146.

The transmission module 138, capable of being communicatively coupled to the memory module 134, may be used to transmit (with or without confirmation by any listening device) at least a part 158 of the solicited or unsolicited computing platform service information 142 to one or more potential subscribers 162 to the respective service. In other words, some portion (or all) of the stored information 142 may be broadcast to various potential subscribers 162, such as PDAs, cellular telephones, laptops, etc.

The apparatus 100 may include a reception module 166 to receive the solicited or unsolicited computing platform service information 142. The reception module 166 may, in turn, comprise a software module to execute in a network 170. In this case, for example, the range area 154 can be defined by a network router count, such as a time-to-live (TTL) value in an Internet Protocol (IP) packet of about 1 to about 3 (i.e., this value may be used to limit the number of router hops a packet is allowed before being discarded). Alternatively, for wireless applications, the range area 154 may be defined by the reception range (e.g., a desired signal strength for received signals) of a wireless reception module 166 coupled to the memory module 134.

In some instances, as mentioned previously, it may be the case that one or more of the service points 150 is not within the useful range of a potential subscriber 162. That is, even though a service point 150 is within the range area 154, and able to communicate with the apparatus 100, the subscriber 162 is unable to successfully communicate with the service point 150. For example, the service point 150 in question may be within radio range of the apparatus 100, but outside of the useful radio range of the potential subscriber 162.

In some embodiments, then, the transmission module 138 may be used to provide one or more directions to the service point 150 that is not within the useful range of the potential subscriber (e.g., latitude/longitude, street address, business name, aisle location in a store, etc.). This may occur, for example, if the potential subscriber 162 indicates that the service point 150 is not within a useful range (i.e., communications between the service point 150 and the subscriber 162 have not been successful).

In another embodiment, a system 120, which may comprise a service broker 168, such as a WSB, may include a memory module 134 to store (solicited or unsolicited) computing platform service information 142 associated with at least one service 146 offered by at least a subset of a plurality of service points 150 located in the selected range area 154. The system 120 may also comprise a transmission module 138, coupled to the memory module 134, to transmit (with or without confirmation) at least a part 158 of the solicited or unsolicited computing platform service information 142 to at least one potential subscriber 162 to one of the services 146. An antenna 174, such as an omnidirectional antenna, one or more dipole antennas, and/or a monople antenna may be coupled to the transmission module 138.

The system 120 may also comprise a reception module 166, coupled to the omnidirectional antenna 174, to receive the (solicited or unsolicited) computing platform service information 142. In some embodiments, it may be assumed that a WSB will advertise all available services in the vicinity. However, in other embodiments, there may be restrictions placed on the services that will be advertised or transmitted to potential subscribers. The choice may be based on a number of parameters. Thus, this portion or part 158 of the computing platform service information 142 may be selected according to a policy.

Many types of policy selection criteria may be used. For example, the policy may specify a service type, such as one of the services listed above. A policy may also be associated with a pecuniary relationship, such as a license agreement between the owner of a WSB and one or more of the service providers (e.g. the service may need a paid subscription to use the wireless service broker). In this case, only licensed service providers might be included in the broadcast of service offerings provided by the broker.

A policy may also be associated with a security relationship, wherein the selected service might be required to provide correct credentials before consideration is given to broadcasting the availability of the service (e.g., an enforced policy). In addition, a policy may be associated with an ownership relationship. For example, services owned by one department might only be advertised by a WSB that is also owned by the same department. This could be considered an unenforced policy, not likely to be abused within a single organization. Thus, a policy may in addition, or alternatively, be associated with many other elements, including a pecuniary relationship, a subscriber device type, an ownership relationship, and/or a security relationship.

As described above, the system 120 may comprise one or more wireless service brokers 168 to receive the part 158 of the solicited or unsolicited computing platform service information 142 from the transmission module 138.

The apparatus 100, system 120, memory module 134, transmission module 138, services 146, service points 150, subscriber 162, reception module 166, service brokers 168, network 170, and antenna 174 may all be characterized as "modules" herein. Such modules may include hardware circuitry, and/or one or more processors and/or memory circuits, software program modules, including object and collections of objects, and/or firmware, and combinations thereof, as desired by the architect of the apparatus 100 and the system 120, and as appropriate for particular implementations of various embodiments.

It should also be understood that the apparatus and systems of various embodiments can be used in applications other than for computers, and other than for systems that include a plurality of wireless service brokers, and thus, various embodiments are not to be so limited. The illustrations of an apparatus 100 and a system 120 are intended to provide a general understanding of the structure of various embodiments, and they are not intended to serve as a complete description of all the elements and features of apparatus and systems that might make use of the structures described herein.

Applications which may include the novel apparatus and systems of various embodiments include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Many different embodiments may be realized. In accordance with some embodiments, one or more WSBs may be located in an environment (e.g. a selected range area) so as to blanket the environment with receivers based on expected or predicted wireless communication distances. One or more of the WSBs may be line powered. A WSB in such an environment may operate so as to be aware of one, some, or all (e.g., at least a subset of a plurality of) offered services in the range area, including those acquired by other WSBs located in the area. One or more of the WSBs may then provide information about the offered services in a summary format to any device listening to its broadcasts.

Such WSBs may not require active administration. Operation might be as simple as placing a WSB in the desired range area, plugging it into a wall outlet, and applying power. At that point, the WSB might begin to listen in an autonomous fashion to the locale (e.g., the range area) to learn what services are available, obtain the corresponding extensible markup language (XML) service descriptions, and offer a summary of the offered services to other (listening) devices, including potential service subscribers.

In other embodiments, such as in an 802.11 environment (i.e., IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999), brokers may take the form of processes or modules running in a network near an access point, rather than as an independent piece of hardware. Broker processes might then listen for all UPnP (i.e., "Universal Plug and Play" Device Control Protocol standard for A Basic Device, Ver. 1.0 and later versions, Dec. 17, 2002) service advertisements on the network and multicast summaries every few seconds on an associated wireless link. Such summaries could, for example, include sufficient information to access the offered UPnP services directly.

Thus, some embodiments may be implemented as a device located at a specific geographic location, and others as a process associated with an access point, providing information about services available at that location (i.e., within the range area) over a wireless link. The range area can be monitored for the presence of wireless services, perhaps provided according to one or more UPnP standards, service offerings can be stored, and a summary of the available services may be multicast on a more or less frequent basis. Mobile devices entering the area may then be able to consistently learn of offered services after a relatively short dwell time, using minimal power.

Figure 2:
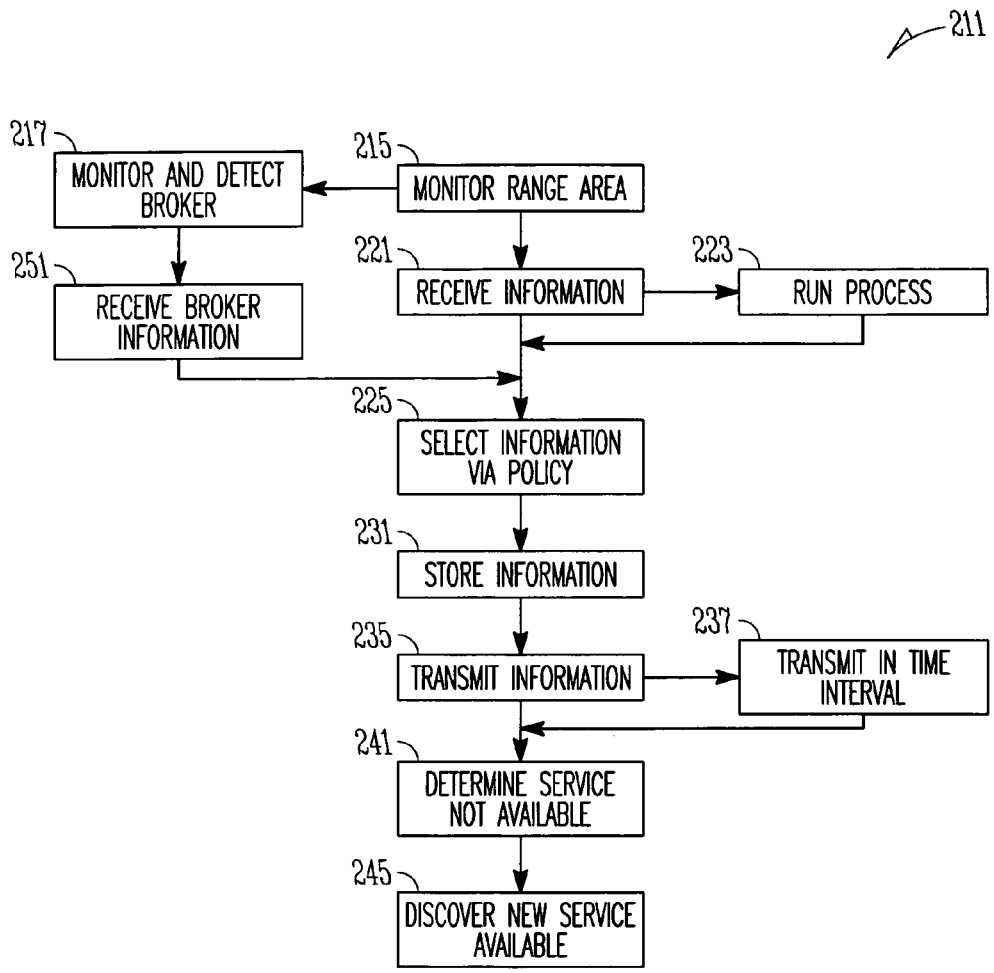
FIG. 2 is a flow chart illustrating several methods according to various embodiments.

FIG. 2 is a flow chart illustrating several methods according to various embodiments. A method 211 may (optionally) begin with monitoring a selected range area to detect one or more (e.g., at least a subset of a plurality of) broadcasting service points at block 215. For example, the method 211 may include monitoring the range area to detect one or more wireless service brokers at block 217 (which in turn monitor their own selected range areas for offered services).

The method 211 may continue with receiving computing platform service information (which may be solicited or unsolicited) associated with one or more services offered by several service points (e.g., a subset of a plurality of services, the subset defined as services available within a selected range area) at block 221. In this manner, for example, one wireless service broker can monitor a selected range area for offered services, including those services listed by another wireless service broker broadcasting service offerings in the same range area. Receiving the (solicited or unsolicited) computing platform service information may include, in turn, running a process, in a network, to receive the (solicited or unsolicited) computing platform service information at block 223. As noted above, the computing platform service information may comprise one or more attributes, such as service type attributes and other attributes, associated with one or more services.

The method 211 may include selecting a portion of the unsolicited computing platform service information for storage. For example, the portion of the (solicited or unsolicited) computing platform service information may be selected according to one or more policies, as described above.

The (solicited or unsolicited) computing platform service information may include one or more XML device descriptions. As noted above, the part of the at least a portion of the (solicited or unsolicited) computing platform service information which is transmitted may include sufficient information to access the service directly. For example, services may be offered by one or more UPnP nodes, and the summary of service offerings may be broadcast on a periodic basis, such as from about every five seconds to about every five minutes.

The method 211 may include storing at least a portion of the (solicited or unsolicited) computing platform service information at block 231, and transmitting (with or without confirmation by any receiving devices) a part of the solicited or unsolicited computing platform service information to one or more potential subscribers to one or more of the services at block 235. The method 211 may include transmission on a periodic basis at block 237, perhaps from a single physical location.

Ideally, a potential subscriber receiving an advertisement from a broker would be able to access each advertised service. However, as mentioned previously, because of the nondeterministic nature of radio (and other wireless) transmissions, errors can occur relative to the ideal. For example, a broker may advertise services that can't be accessed by the receiving node. Such errors may be considered a "false positive". In addition, a broker may fail to advertise a service that is available to the subscriber, but not to the broker. Such errors may be considered as "false negatives".

These type of failures may result from differences in radio coverage between the service and the broker. Such differences may be largely eliminated if the services and the broker share the same radio. In that case, the broker might restrict advertising to services available from that radio. However, an independent broker, having its own radio, provides several advantages. Such advantages may be chosen over the possibility of accumulating false positives/negatives.

Several sources of error may be present when an independent broker is used. First, the broker may advertise services that occur on two or more different service points, each with their own unique radio coverage. Second, the broker may be located at significant distance from an advertised service point, such that the radio coverage of the service point doesn't match the radio coverage of the broker. Third, the radio coverage of the broker may not match the radio coverage of service points even those that are co-located, due the inherent variability of transmission characteristics of different radios and antennas.

To enhance the operation of some embodiments, several mechanisms may be adopted. First, a broker advertisement may be treated as a hint by a potential subscriber. It should be noted that all advertisements might be considered to be hints at some level since there is no atomicity between advertisement and service fulfillment, even with respect to the node providing a service. That is, if a service node advertises a service, there is always a chance that the node will be unable to provide the service, even if the service is requested immediately (power outage, subscriber leaving the radio coverage area, etc.).

Second, brokers may advertise all services of which they are aware. This might result in false positives, but these can be verified and dealt with using a communication process between the broker and the potential subscriber if successful communications between the subscriber and the service are not effected.

Third, brokers may provide information about the existence of other brokers in the vicinity. In this case, the other brokers may be aware of services the subscriber can access at its current location. In this case, the number of false negative may be reduced.

Fourth, a broker (e.g., a primary broker) may advertise services located by other brokers (e.g., secondary brokers). Because a primary broker may be line-powered and have a better antenna than mobile devices, it may be able to communicate with secondary brokers that are not usable by the mobile device.

However, the service itself may be accessible to the subscriber, even if it is not known to the primary broker. In that case the primary broker transmitting the advertisement to a potential subscriber might indicate that the advertisement represents "local hearsay" along with information about the (secondary) broker providing it. Again, this implementation may reduce the number of false negatives.

Finally, wireless services may be discovered in conjunction with a multitude of coordinate systems. In this case, a broker can direct the potential subscriber to the location of a service it is advertising (perhaps providing a stronger signal) or to a neighboring broker (allowing additional services to be discovered), or to a hearsay service (allowing access to a service otherwise unavailable).

Some embodiments may provide a tradeoff between false positives and false negatives. Typically, the cost of a false positive includes taking time and other resources with respect to a potential subscriber. This may be a very high cost in some cases. However, the cost of false negatives may be even higher, since failing to find a needed service may be more frustrating than receiving notification of an available service that can't be accessed. In some embodiments, the use of false positives may be used to reduce the number of false negatives. In the case of a WSB, the cost of a false positive may be mitigated by accessing the actual service to verify its availability before notifying the potential subscriber.

Thus, the method 211 may also include determining that one or more services offered by one or more of the plurality of service points is no longer available at block 241. This may occur in a number of ways, including periodic polling of the known service offerings and determining that one or more services do not respond to a polling query. Another example includes having a timeout period associated with each service during which availability updates are expected to be received, and determining that one or more services do not respond within a selected timeout period.

The method 211 may include discovering that a new service offered by one or more of the plurality of service points is currently available at block 245. In fact, the method 211 may include discovering that a new service offered by an additional service point, not included in the plurality of service points, is currently available. For example, this may occur by learning of the service due to another WSB broadcasting service offerings in the same range area. Thus, the method 211 may also include receiving computing platform service information associated with at least one service offered by one or more of a plurality of service points located in another range area from a single wireless service broker at block 251. Whether the new service is within the same range area or not, the method 211 may also include providing a direction to the new service. As noted previously, this may occur if a potential subscriber is unable to effectively communicate with the new service, and provides an indication of these circumstances to the WSB from which it received information regarding the availability of the new service. Such an indication, as well as the direction to the new service, may be routed through a number of WSBs until it reaches the potential subscriber, if necessary.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms well-known to those skilled in the art, such as application program interfaces or interprocess communication techniques, including remote procedure calls. The teachings of various embodiments of the present invention are not limited to any particular programming language or environment, including Hypertext Markup Language (HTML) and Extensible Markup Language (XML).

Figure 3:
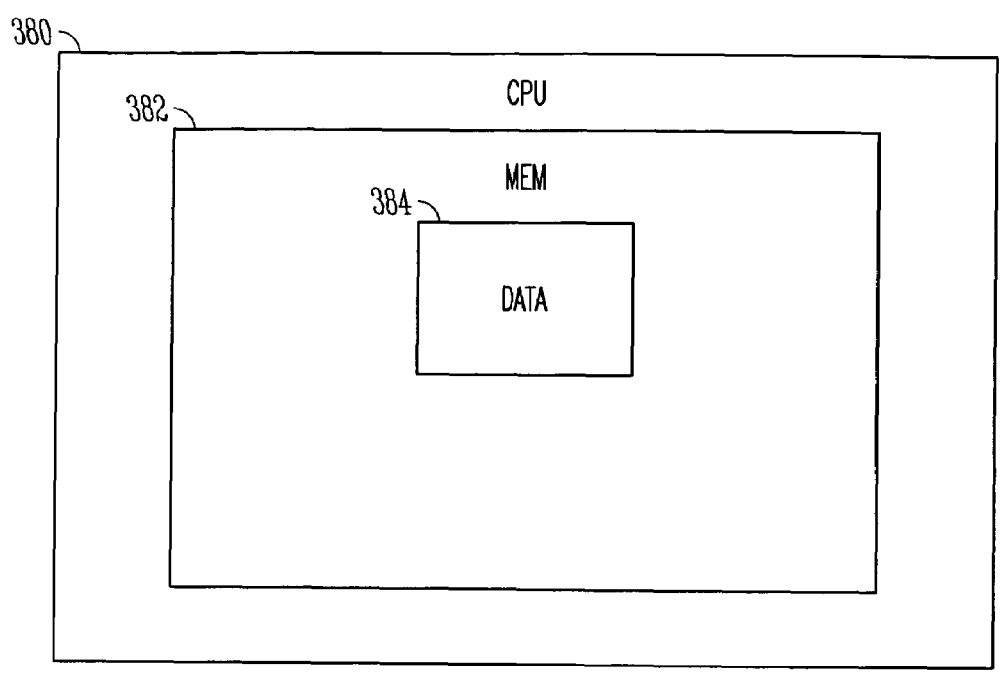
FIG. 3 is a block diagram of an article according to various embodiments.

Thus, other embodiments may be realized. For example, FIG. 3 is a block diagram of an article 380 according to various embodiments, such as a computer, a memory system, a magnetic or optical disk, some other storage device, and/or any type of electronic device or system. The article 380 may comprise a machine-accessible medium such as a memory 382 (e.g., a memory including an electrical, optical, or electromagnetic conductor) having associated data 384 (e.g., computer program instructions), which when accessed, results in a machine performing such actions as receiving (solicited or unsolicited) computing platform service information associated with at least one service offered by one or more of a plurality of service points in a range area. Other activities may include storing at least a portion of the solicited or unsolicited computing platform service information, and periodically transmitting (with or without confirmation), a part of the at least a portion of the solicited or unsolicited computing platform service information to at least one potential subscriber to the at least one service.

Periodically transmitting (with or without confirmation), the part of the at least a portion of the solicited or unsolicited computing platform service information may include transmitting (with or without confirmation) the part of the at least a portion of the computing platform service information at intervals of less than about every five minutes. As described above, receiving (solicited or unsolicited) computing platform service information may further include running a process, in a network, to receive the information. Other activities may include selecting a portion of the (solicited or unsolicited) computing platform service information according to a policy, such as a policy associated with a pecuniary relationship.

Improved quality and quantity of reported service offerings within a selected range area may result from implementing the apparatus, systems, and methods disclosed herein. The time spent by users in attempting to determine the availability of, and the possibility of access to such services may thus be reduced.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method, comprising:
   receiving computing platform service information associated with a plurality of services offered by a plurality of service points;
   storing at least a portion of the computing platform service information; and
   periodically transmitting, without solicitation and confirmation, some of the computing platform service information to at least one potential subscriber to the plurality of services.

2. The method of claim 1, further comprising:
   determining that at least one service included in the plurality of services is no longer available.

3. The method of claim 2, wherein determining that the at least one service is no longer available further comprises:
   determining that the at least one service does not respond to a polling query.

4. The method of claim 2, wherein determining that the at least one service is no longer available further comprises:
   determining that the at least one service does not respond within a selected timeout period.

5. The method of claim 1, further comprising:
   discovering that a new service offered by one of the plurality of service points is currently available.

6. The method of claim 5, further comprising:
   providing a direction to the new service.

7. The method of claim 1, further comprising:
   discovering that a new service offered by an additional service point not included in the plurality of service points is currently available.

8. The method of claim 1, wherein the plurality of services comprise at least two of: a network connection service, a printer service, a display service, a storage service, an inventory service, a game service, an interactive customer service, a query service, or an advertising service.

9. The method of claim 1, wherein periodically transmitting occurs at a single physical location.

10. The method of claim 1, wherein the plurality of service points are located in a range area.

11. The method of claim 10, further comprising:
    monitoring the range area to detect a plurality of broadcasting service points.

12. The method of claim 10, further comprising:
    monitoring the range area to detect at least one wireless service broker.

13. The method of claim 10, wherein the range area comprises a first range area, further comprising:
receiving computing platform service information associated with at least one service offered by at least a subset of a plurality of service points located in a second range area from a single wireless service broker.

14. The method of claim 1, further comprising:
receiving at least some of the computing platform service information from a wireless service broker.

15. The method of claim 1, wherein the computing platform service information includes an extensible markup language device description.

16. The method of claim 1, wherein said some of the computing platform service information includes sufficient information to access at least one of the plurality of services directly.

17. The method of claim 1, wherein at least one of the plurality of services is offered by a Universal Plug and Play (UPnP) node.

18. The method of claim 1, wherein the computing platform service information comprises at least one attribute associated with the plurality of services.

19. The method of claim 18, wherein the at least one attribute is selected from at least one of a range, a signal strength, and a location.

20. An article comprising a tangible computer-readable storage medium containing computer-executable instructions stored therein which, when executed, result in a computer performing:
receiving computing platform service information associated with a plurality of services offered by a plurality of service points;
storing at least a portion of the computing platform service information; and
periodically transmitting, without solicitation and confirmation, some of the computing platform service information to at least one potential subscriber to the plurality of services.

21. The article of claim 20, wherein periodically transmitting, without solicitation and confirmation, further comprises:
transmitting, without solicitation and confirmation, said some of the computing platform service information at intervals of less than about every five minutes.

22. The article of claim 20, wherein receiving computing platform service information further comprises:
running a process, in a network, to receive the computing platform service information.

23. The article of claim 20, wherein executing the computer-executable instructions results in the computer performing:
selecting said some of the computing platform service information according to a policy.

24. The article of claim 23, wherein the policy is associated with at least one of a pecuniary relationship, an ownership relationship, a security relationship, and a device type.

25. The article of claim 20, wherein the computing platform service information comprises at least one attribute associated with at least one of the plurality of services.

26. The article of claim 25, wherein the at least one attribute is selected from at least one of a range, a signal strength, and a location.

27. An apparatus, comprising:
a memory module to store computing platform service information associated with a plurality of services offered by a plurality of service points in a range area; and
a transmission module, coupled to the memory module, to periodically transmit without solicitation and confirmation some of the computing platform service information to at least one potential subscriber to the plurality of services.

28. The apparatus of claim 27, further comprising:
a reception module to receive the computing platform service information.

29. The apparatus of claim 27, wherein the reception module comprises a software module to execute in a network.

30. The apparatus of claim 27, wherein the plurality of service points are located in a range area defined by a network router count.

31. The apparatus of claim 30, wherein the network router count comprises a time-to-live count of about 1 to about 3.

32. The apparatus of claim 27, wherein the plurality of service points are located in a range area defined by a reception range of a wireless reception module coupled to the memory module.

33. The apparatus of claim 27, wherein the transmission module is to provide a direction to at least one of the plurality of service points if the at least one potential subscriber indicates the at least one of the plurality of service points is not within a useful range of the at least one potential subscriber.

34. The apparatus of claim 27, wherein the computing platform service information comprises at least one attribute associated with the plurality of services.

35. The apparatus of claim 34, wherein the at least one attribute is selected from at least one of a range, a signal strength, and a location.

36. A system, comprising:
a memory module to store computing platform service information associated with a plurality of services offered by a plurality of service points in a range area;
a transmission module, coupled to the memory module, to transmit without solicitation and confirmation some of the computing platform service information to at least one potential subscriber to the plurality of services; and
an omnidirectional antenna coupled to the transmission module.

37. The system of claim 36, further comprising:
a reception module, coupled to the omnidirectional antenna, to receive the computing platform service information.

38. The system of claim 36, wherein said some of the computing platform service information is selected according to a policy.

39. The system of claim 38, wherein the policy specifies a service type.

40. The system of claim 36, further comprising:
a wireless service broker to receive said some of the computing platform service information from the transmission module.

41. The system of claim 36, wherein the computing platform service information comprises at least one attribute associated with the plurality of services.

42. The system of claim 41, wherein the at least one attribute is selected from at least one of a range, a signal strength, and a location.

* * * * *